(12) United States Patent
Fasanello, Jr.

(10) Patent No.: US 7,104,348 B2
(45) Date of Patent: Sep. 12, 2006

(54) ELECTRIC-STEAM PROPULSION SYSTEM

(75) Inventor: John Joseph Fasanello, Jr., Bloomsbury, NJ (US)

(73) Assignee: John Fasanello, Jr., Bloomsbury, NJ (US)

( * ) Notice: Subject to any disclaimer, the term of this patent is extended or adjusted under 35 U.S.C. 154(b) by 0 days.

(21) Appl. No.: 10/417,554

(22) Filed: Apr. 17, 2003

(65) Prior Publication Data

US 2003/0230446 A1    Dec. 18, 2003

Related U.S. Application Data

(60) Provisional application No. 60/389,414, filed on Jun. 17, 2002.

(51) Int. Cl.
*B60K 1/00* (2006.01)

(52) U.S. Cl. ............... 180/65.2; 180/65.3; 180/310

(58) Field of Classification Search ............. 180/301, 180/304, 302, 303, 165, 65.4, 287, 310; 123/179.3, 123/491, 25 M, 568.15; 318/193, 150; 60/39.54, 60/39.58, 730; 701/108, 103, 123

See application file for complete search history.

(56) References Cited

U.S. PATENT DOCUMENTS

| | | | | | |
|---|---|---|---|---|---|
| 578,031 | A | * | 3/1897 | Skvara | 180/304 |
| 1,751,734 | A | * | 3/1930 | Harris | 180/303 |
| 4,020,637 | A | * | 5/1977 | Izumi | 60/665 |
| 4,094,377 | A | * | 6/1978 | Biggs | 180/65.1 |
| 4,326,598 | A | * | 4/1982 | Acker | 180/304 |
| 4,412,204 | A | * | 10/1983 | Pagane | 180/287 |
| 4,475,493 | A | * | 10/1984 | Masteller et al. | 123/179.3 |
| 4,541,367 | A | * | 9/1985 | Lindberg | 123/568.15 |
| RE32,156 | E | * | 5/1986 | Tokuda et al. | 701/108 |
| 5,925,993 | A | * | 7/1999 | Lansberry | 318/139 |
| 6,263,664 | B1 | * | 7/2001 | Tanigawa et al. | 60/39.54 |
| 6,397,962 | B1 | * | 6/2002 | Bllau | 180/65.2 |

* cited by examiner

*Primary Examiner*—Hau Phan

(57) ABSTRACT

An improved method of propelling land, water, and air vehicles by utilizing an electrical source of initial energy (10), a "flash"-type boiler (14), and a steam engine (16). The system employs the usual devices, such as an alternator (22), voltage regulator (24), and other appurtenances of modern vehicles.

3 Claims, 1 Drawing Sheet

ELECTRIC-STEAM PROPULSION SYSTEM

Figure 1:
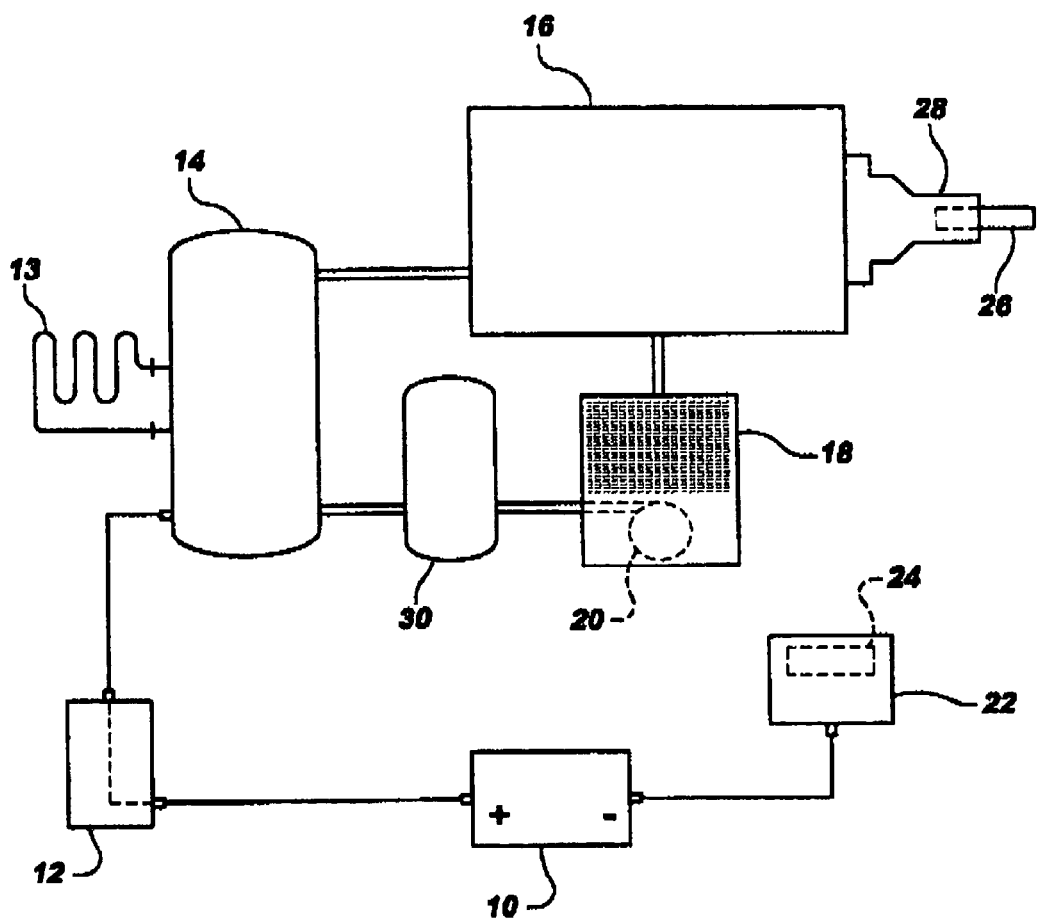
Figure 1:
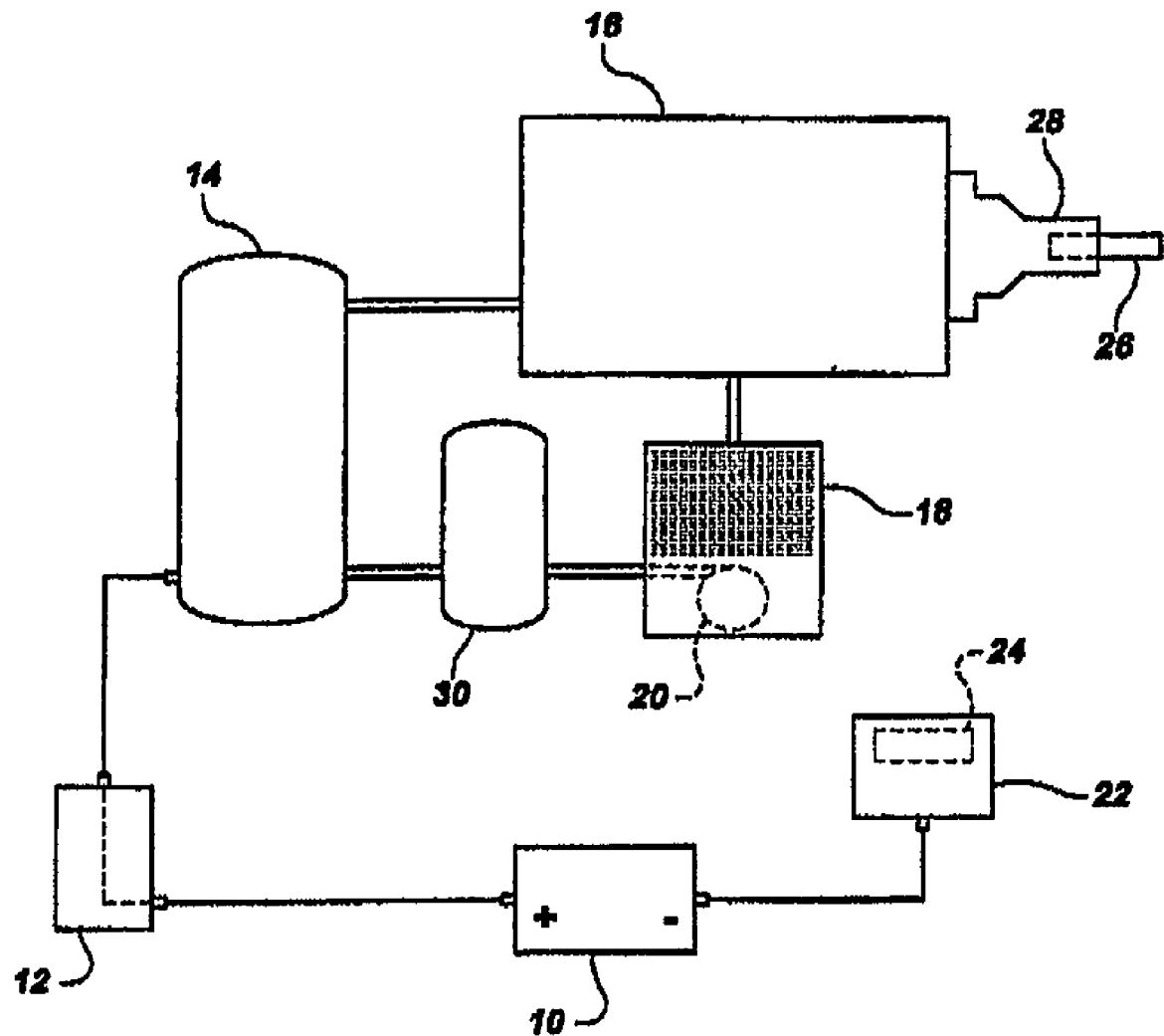

This invention claims the benefit of Provisional Patent Application Ser. No. 60/389,414, filed 17 Jun. 2002.

BACKGROUND—FIELD OF THE INVENTION

This invention relates to methods of propelling vehicles on land and water and in the air without using wood, fossil fuels, or any other combustible material.

BACKGROUND—DESCRIPTION OF PRIOR ART

Conveyances such as autos, trucks, buses, trains, airplanes, boats, and the like have been powered by engines of various types. Most prominent in that regard have been fossil-fuel-powered engines. Even steam-engined vehicles like the Stanley Steamer and trains, however, have utilized fossil fuels to create steam by boiling water, thus polluting the atmosphere, as well as the soil and vegetation, and the ground water.

Modern attempts to build steam-powered cars still depend on the burning of petroleum-based fuel to create the heat to boil the water to produce the steam. Those vehicles, then, still cause pollution, and still require petroleum-based products, which may not be so easy to procure in the future or during wars.

Another problem with fuel-burning engines is that they must be manufactured with all sorts of pollution-controlling devices, thus increasing both costs and the chances for breakdowns because of complexity of construction.

Because of ever-increasing laws regarding how many and to what extent contaminants may be spewed into the atmosphere, not only do costs increase, but many motorists become irate when they are denied the use of vehicles exceeding the pollution limits enacted into law.

Even the simple use of exhaust pipes and mufflers, in addition to cost and frequency of replacement, has become complicated by the anti-pollution laws of states and nations.

Aside from fossil-fueled engines, other methods of propulsion have been tried but found wanting. For example, solar energy, while non-polluting, does not provide enough power for a long enough duration to be practical.

Battery-powered vehicles must be extremely heavy because of the number of batteries required to move a vehicle for a reasonable distance and for a fairly long duration. They also need constant recharging. Therefore, costs are prohibitive, especially in terms of value per dollar expended to travel any goodly distance.

The combination of gasoline and electricity used to power some recently-produced autos is promising in terms of miles-per-gallon, but still produces pollution and requires many parts for both operation and cleansing of exhaust gases, as well as constant purchases of fuel.

Hydrogen fuel cells produce no pollution but would add large amounts of water vapor to the air, thus increasing humidity to such an extent as, perhaps, to worsen other problems, including breathing for certain sufferers. Besides there is no easy source of hydrogen, and to produce the gas would still require vast amounts of electricity, which would be obtained by burning large amounts of fossil fuels or by atomic means.

Propane burns cleaner than gasoline but is a product of refining and does not exist in nature; it would still cause pollution by burning. So would natural gas or methane; none of these methods is pollution-free. Some are also dangerous because of high volatility.

Other devices, such as large flywheels or coiled springs, are highly impractical for powering vehicles.

OBJECTS AND ADVANTAGES

The present invention, the electric-steam propulsion system, has several objects and advantages:

(a) to provide a source of power for vehicles that will greatly reduce atmospheric, soil, and water pollution;

(b) to reduce costs of purchase, operation, and repairs by eliminating many parts needed in other engines, such as sparkplugs, coils, fuel injectors, exhaust systems, catalytic converters, special anti-pollution devices and so on;

(c) to reduce costs and save natural resources by obviating the need to purchase combustibles such as gasoline every time a previously purchased supply has been consumed;

(d) to aid the cause of good health by greatly reducing contaminants in soil, water, and air;

(e) to eliminate the dangers of asphyxiation by reason of noxious exhaust gases;

(f) to reduce the dangers of the "greenhouse effect," if such really is a problem caused partly by engine exhaust gases;

(g) to reduce the possibility of fire or explosion caused by mishaps involving combustible fuels;

(h) to shorten time traveled by eliminating the need to stop for refueling;

(i) to reduce the weight and cost of vehicles by using fewer parts associated with typical engines, exhaust systems, and drive trains;

j) to reduce the odors and heat associated with fuel-burning engines.

Further objects and advantages of my invention will become apparent from a consideration of the ensuing description.

DRAWING

The single attached drawing is simple and straightforward. Because the new invention is based on and utilizes existing devices for its operation, anyone with a modicum of mechanical knowledge can understand the system.

The parts of my invention include a battery or batteries, an inverter, a "flash" boiler, a steam engine, an alternator, a voltage regulator, a condenser, a pump, a device, such as a drive shaft, of propulsion-power transference for a vehicle; a container for fluid; and a transmission, if required, depending on the type of steam engine utilized.

REFERENCE NUMERALS IN DRAWING 10 battery
12 inverter
14 flash boiler
16 steam engine
18 condenser
20 pump
22 alternator
24 voltage regulator
26 propulsion-power transference device
28 optional transmission
30 container for fluid

SUMMARY

In accordance with the present invention, land, water, and airborne vehicles are propelled by a new combination of electrical and steam devices.

DESCRIPTION

A typical embodiment of the propulsion system is illustrated in the drawing. Included are a battery or batteries 10. Also utilized are an inverter 12 and a steam boiler of a rapid-heating nature, such as a "flash" boiler 14, and a steam engine 16. A condenser 18 and a pump 20 are included in the system, as is a container 30, such as a tank, for fluid. An alternator 22 and a voltage regulator 24 are parts of the main electrical system. A method of propulsive-power transference such as a drive shaft 26 and an optional transmission 28 complete the basic system.

All other usual parts, such as belts, fuses, accessories and the like need not obtrude into the depiction of the new uses of the main elements of the invention, as they are ancillary.

The reader, therefore, will see that my electric-steam propulsion system provides a simple, reliable, economic, non-polluting method of powering conveyances on land and water, and in the air; and greatly reduces dependence on fossil fuels, thus aiding the quality of plant and animal life on earth and saving natural resources.

In addition, due to less pollution, good health shall be fostered in general, and the use of vehicle exhaust for suicide, eliminated. Fires and explosions due to crashes will also be done away with. Exhaust gases will be reduced to such a level that they will not increase the alleged "greenhouse effect." The foul odors of burning fuels will also largely disappear.

In short, the whole system of combustion engines, with all their complexity, costs, and various types of pollution and other problems will be greatly minimized, if not entirely ended.

OPERATION

The electric-steam propulsion system employs parts typically found in vehicles for land, water, and atmospheric travel and similar uses. It differs basically in that electricity, not fossil fuels, sunlight, or even simply batteries, is used to provide the basic source of power to create steam and drive an engine.

A battery or batteries of sufficient strength 10 provide electricity to an inverter 12 to rapidly heat fluid from a tank 30 in an efficient boiler such as the "flash" variety 14, which very quickly brings up steam. The entire fluid-steam flow occurs in a tightly-sealed system.

The resultant steam is then utilized to drive a steam engine 16, which will transfer power by methods such as a drive shaft or other typical devices to an actual vehicle-propelling device, whether wheels, propellers, or other device.

Steam will become liquid once again by means of a condenser, such as a radiator 18, with usual fan, if needed, and returned to the tank and then the boiler by the action of a pump or pumps 20, unless a gravity-feed or other operation can be employed. Then the process will be repeated as new steam is made. Since the system is sealed as tightly as possible, there will be no or little loss of fluid or steam. Since this type of engine can run with very little fluid needed, hardly any pollution will occur. In addition, there is no danger of explosion with this kind of steam engine, thus giving a great safety factor over other types of steam engines and fossil-fuel engines.

In order to recharge the battery or batteries, a typical alternator 22 is employed, along with a voltage regulator 24, either internal or external to said alternator, just as currently found in typical conveyances. A transmission 28 for conducting motive power from the engine through a propulsion-transference device, such as a drive shaft 26, is optional, depending on the type of steam engine used in the system. For example, a two-cylinder, double-acting full Uniflow engine requires no gearbox. Other types of engines may need a gearbox to get power to the actual vehicle-moving device.

This description of the basic operation of the invention omits all the other aspects of modern vehicles, as they are not involved in the elemental system. Belts and accessories, for example, will be provided by vehicle manufacturers in typical manners.

Also not covered in detail is a major embodiment whereby my invention is used in a stationary setting to produce electricity by utilizing an electricity-generating device in place of a transmission or other propulsion device.

CONCLUSION, RAMIFICATIONS, AND SCOPE

Accordingly, the electric-steam propulsion system has distinct advantages over other methods of self-propelling vehicles. For one, it greatly reduces pollution of the environment. Further, it has additional advantages in that

- it reduces costs of manufacture, operation, and repairs by virtue of requiring fewer parts;
- it saves natural resources by drastically curtailing the demand for gasoline;
- it reduces the results of the "greenhouse effect";
- it aids the cause of good health and "quality of life";
- it greatly reduces the possibility of fires and explosions associated with gasoline engines;
- it prevents asphyxiation by exhaust gases;
- it reduces noxious odors and heat from burning gasoline;
- it reduces travel times and costs because of the ability to progress for long periods of time without needing to refuel.

Although my above description contains many specificities, these should not be construed as limitations on the scope of the invention, but rather as the exemplification of one major embodiment thereof. Many other variations are possible. For example, one important variation is to use the basic device to generate electricity by substituting a generator for the transmission. Thus, individuals, villages, and other entities could produce electricity for themselves.

In addition, large power-generating plants, using much larger batteries and other components, could generate electricity for distribution and sale while eliminating reliance on either fossil fuels or atomic energy; thus, fewer pollutants would occur, and the dangers of atomic contamination or worse would be eliminated entirely.

A different type of boiler may be employed in such stationary applications that may not require a "flash" boiler.

Therefore, the scope of the invention should be determined by the appended claims and their legal equivalents, rather than by the examples given.

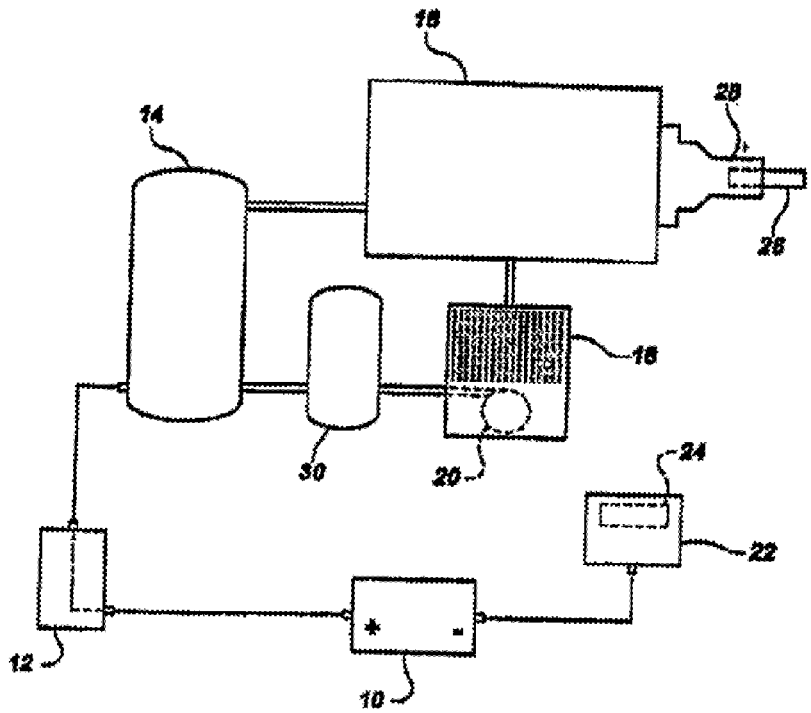

I claim:

1. An electric-steam propulsion system comprising a steam engine connecting to wheels, a propeller or other device for providing mechanical energy to drive a vehicle without requiring an electric motor or other device for starting or driving said vehicle;
  means for controllably coupling said mechanical energy from said steam engine, whereby said vehicle will be self-propelled; and
  a flash boiler tube system for rapidly heating fluid derived from a container of said fluid; and
  non-combustion heating element means for rapidly heating fluid to create steam to supply said steam engine; and
  direct-current electric supply means for providing initial energy in said system; and means selected from the group including electrical inverters for converting said direct current electricity into alternating current electricity to supply said non-combustion heating means; and
  means selected from the group including voltage regulators for controlling the amount and flow of electricity in said system; and
  means selected from the group including alternators for continuing to provide electricity for recharging said initial direct current means of energy, whereby said system will continue to operate as long as is desired;
  means for condensing said steam back into said fluid; and
  means for returning said fluid to said container and thence to said tube-type flash boiler.

2. The system of claim 1 utilized in a stationary configuration, including and substituting mechanical devices for vehicles; whereby said mechanical energy produced by steam engines is used to drive said mechanical devices to perform work.

3. The system of claim 1 utilized in a stationary configuration, including and substituting electrical generators for vehicles; whereby said mechanical energy produced by steam engines is used to drive said generators to produce electricity.

* * * * *

UNITED STATES PATENT AND TRADEMARK OFFICE
CERTIFICATE OF CORRECTION

| | | |
|---|---|---|
| PATENT NO. | : 7,104,348 B2 | |
| APPLICATION NO. | : 10/417554 | |
| DATED | : September 12, 2006 | |
| INVENTOR(S) | : Fasanello et al. | |

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheet, and substitute therefor drawing sheet. (attached)

Signed and Sealed this

Thirteenth Day of November, 2007

JON W. DUDAS
*Director of the United States Patent and Trademark Office*

(12) United States Patent
Fasanello, Jr.

(10) Patent No.: US 7,104,348 B2
(45) Date of Patent: Sep. 12, 2006

(54) ELECTRIC-STEAM PROPULSION SYSTEM

(75) Inventor: John Joseph Fasanello, Jr., Bloomsbury, NJ (US)

(73) Assignee: John Fasanello, Jr., Bloomsbury, NJ (US)

(*) Notice: Subject to any disclaimer, the term of this patent is extended or adjusted under 35 U.S.C. 154(b) by 0 days.

(21) Appl. No.: 10/417,554

(22) Filed: Apr. 17, 2003

(65) Prior Publication Data
US 2003/0230446 A1  Dec. 18, 2003

Related U.S. Application Data

(60) Provisional application No. 60/389,414, filed on Jun. 17, 2002.

(51) Int. Cl.
B60K 1/00 (2006.01)
(52) U.S. Cl. .............. 180/65.2; 180/65.3; 180/310
(58) Field of Classification Search .............. 180/301, 180/304, 302, 303, 165, 65.4, 287, 310; 123/179.3, 123/491, 25 M, 568.15; 318/193, 150; 60/39.54, 60/39.58, 730; 701/108, 103, 123
See application file for complete search history.

(56) References Cited

U.S. PATENT DOCUMENTS

| 578,031 | A | * | 3/1897 | Skvara | 180/304 |
| 1,751,734 | A | * | 3/1930 | Harris | 180/303 |
| 4,028,637 | A | * | 5/1977 | Izumi | 60/665 |
| 4,094,377 | A | * | 6/1978 | Biggs | 180/65.1 |
| 4,326,598 | A | * | 4/1982 | Acker | 180/304 |
| 4,412,204 | A | * | 10/1983 | Pagano | 180/297 |
| 4,475,493 | A | * | 10/1984 | Masteller et al. | 123/179.3 |
| 4,541,367 | A | * | 9/1985 | Lindberg | 123/568.15 |
| RE32,156 | E | * | 5/1986 | Tokuda et al. | 701/108 |
| 5,925,993 | A | * | 7/1999 | Lansberry | 318/139 |
| 6,263,664 | B1 | * | 7/2001 | Tanigawa et al. | 60/39.54 |
| 6,397,962 | B1 | * | 6/2002 | Bliss | 180/65.2 |

* cited by examiner

*Primary Examiner*—Hau Phan

(57) ABSTRACT

An improved method of propelling land, water, and air vehicles by utilizing an electrical source of initial energy (10), a "flash"-type boiler (14), and a steam engine (16). The system employs the usual devices, such as an alternator (22), voltage regulator (24), and other appurtenances of modern vehicles.

3 Claims, 1 Drawing Sheet